3,544,486
REFRACTORY BODIES CONTAINING ALUMINUM NITRIDE, BORON NITRIDE AND TITANIUM BORIDE
Edmund M. Passmore, Wilmington, Mass., assignor to Sylvania Electric Products Inc., a corporation of Delaware
No Drawing. Filed May 23, 1968, Ser. No. 731,620
Int. Cl. H01b *1/06*
U.S. Cl. 252—520          9 Claims

ABSTRACT OF THE DISCLOSURE

An electrically conductive ceramic body contains an admixture of AlN and BN and together with $TiB_2$ as a conductive material. The body can be manufactured by thoroughly mixing the powdered ingredients and then vacuum hot pressing the mixture in suitable molds. A boat suitable for the evaporation of vapor-deposition metals, such as aluminum, can be either molded in a desired shape or machined from the hot pressed body.

BACKGROUND OF THE INVENTION

Field of the invention

There is a constant search for new compositions or bodies that possess unexpected combinations of properties desirable in specific fields of use. The bodies of the present invention possess certain combinations of properties and characteristics that render them of considerable value, and they offer good possibilities in a number of fields of use. However, their important characteristics as electrically conductive refractory bodies make them especially suitable in high temperature applications where electrical conductivity is a desired property. Such an application is the vapor deposition of metals, where the metal is evaporated from a heated boat, in vacuo, and deposited on an article therein.

Description of the prior art

Well-known electrically conductive refractory materials are carbon or graphite, and evaporating boats thereof have been used in the past, especially in the vacuum deposition of metals such as aluminum. However, owing to the very short operating life of these boats, easily corroded by molten aluminum at its vaporizing temperature, they are frequently protected by an outer coating of such materials as titanium carbide, hafnium carbide, tantalum carbide, and others, which are corrosion resistant to molten aluminum. This approach restricts performance to the inherent physical properties of the coatings used. For this reason, boats having the said coatings have a useful life of only a few hours, even at relatively low vaporization rates. These limitations have made it impractical to consider commercial operations of continuous, high speed, aluminum vapor coating processes in industry. Accordingly, vapor coating has usually been restricted to a batch, or semi-batch type of operation.

More recent research has led to the conclusion that the inertness of boron nitride (BN) to liquid Al would make it an ideal material for the subject purpose.

The major difficulty with using boron nitride boats for the above purpose is that such boats, owing to their high electrical resistivity have to be heated by an outside source. One method is the employment of a resistance-heated carbon container. Together the boron nitride boat and the carbon container form a double crucible system. Although use of a double crucible has some merit, it has a major drawback. When the system is heated to the desired temperatures of about 1100° C. to 1700° C., and aluminum is fed into the crucible, the metal may creep up and over the sides of the inner crucible onto the carbon crucible, and react to form aluminum carbide. When this happens, the carbon crucible tends to crack rapidly, thus breaking the electrical heating circuit. The equipment then must be shut down, and new crucibles installed.

Accordingly, a new composition of matter, capable of being formed in shaped bodies and having improved properties of electrical conductivity, corrosion resistance and stability at elevated temperatures, is highly desirable. It is especially desirable in the vacuum-metal-deposition field where longer lived and more dependable evaporation boats are sought.

SUMMARY OF THE INVENTION

AlN and BN possess several characteristics making them desirable for high temperature applications, such as evaporating boats for the vacuum deposition of Al and other metals. These characteristics include thermal stability, chemical inertness and resistance to attack by molten Al at high temperatures. In addition, the sinterability of AlN makes it a desirable constituent of refractory composites, in contrast to pure BN and other borides, which can be sintered and hot pressed only with difficulty. However, because of their high electrical resistivities, AlN and BN, alone, are not suitable for resistance heating applications, such as self resistant heated evaporating boats.

According to the present invention, a ternary series of ceramic composites in which AlN and BN are combined with a conductive refractory material such as $TiB_2$ provides compositions having refractory electrically conductive properties which are especially suitable for high temperature applications, such as resistant heated evaporating boats. Furthermore, the electrical resistivity of bodies produced from such compositions can be varied for the purpose of satisfying particular requirements by varying the ratio of the ingredients.

Unexpectedly, significant variations in the resistivity of different compositions can be obtained by varying the rato of the insulative components, that is, the AlN and BN. Table I, below, shows the electrical resistivity of composites for ratios of AlN and BN varying from zero to one, where the $TiB_2$ is maintained at 33.5 volume percent.

TABLE I
Electrical Resistivity of AlN-BN-$TiB_2$ Ternary Composites

| Volume Ratio, AlN/BN | Composition, wt. percent | | | Electrical resistivity, microhm-cm. |
|---|---|---|---|---|
| | AlN | BN | $TiB_2$ | |
| 1.0 | 32.5 | 22.5 | 45.0 | 558 |
| 0.2 | 11.6 | 40.1 | 48.3 | 821 |
| 0.05 | 3.4 | 47.0 | 49.0 | 1,255 |
| 0.00 | 0.0 | 50.0 | 50.0 | 585 |

It can be seen that minimum resistivity occurs at an AlN/BN ratio of 1.0 and maximum resistivity at 0.05. At the 0.05 ratio, the volume percent of AlN is 3.16 and that of BN is 63.2.

It is evident from the decreasing electrical resistivities, with further increases in AlN, that resistivities approximating those of the corresponding binary composites, consisting of $TiB_2$ and BN alone, can be achieved at an AlN/BN ratio of 1.0. The trend of the data indicates that further decreases in resistivity may be anticipated with higher AlN contents.

For many uses, where it is desired to obtain an electrical resistivity approximating that of the binary composite of 33.5 volume percent (50.0 weight percent) $TiB_2$ and 66.5 volume percent (50.0 weight percent) BN, a ternary composite with an AlN/BN ratio of 1.0 would be preferred. In such cases the substantial amount of AlN in the composite confers many valuable properties, including resistance to surface abrasion and chalking, which is a problem with the binary composites of BN and $TiB_2$ alone. Other desirable benefits anticipated with the AlN component include increased resistance to attack by atmospheric moisture, increased resistance to high temperature corrosion by liquid Al, and increased resistance to high temperature interaction with graphite and tungsten. The borides in general are relatively unstable in contact with tungsten as well as other refractory metals. The inclusion of a substantial proportion of AlN as a replacement for a corresponding amount of BN results in increased stability where such contacts are involved, increased strength and also results in a significant reduction in the cost of raw materials. However, the retention of a substantial BN content in these composites is still useful in order to facilitate machining of useful shapes.

For many other uses, however, especially where easy machinability is important, compositions approximating the peak resistivity, in the vicinity of 3.16 volume percent AlN are preferred. Such compositions may be useful where maximum $TiB_2$ and minimum BN contents are desired, coincidentally with maximum electrical resistivity. Normally, using only the conventional binary composites, this combination of properties would represent contradictory or mutually exclusive requirements.

In one method of forming bodies according to this invention, predetermined amounts of the aluminum nitride, boron nitride, and titanium diboride are thoroughly mixed together. The mixture is then hot pressed, in vacuo, in suitable graphite molds. Table II, below, shows the resistivity and density of various compositions prepared in this manner. The composites were all vacuum hot pressed at 1800° C. at 5000 p.s.i. for 2 hours.

TABLE II
Properties of $TiB_2$-BN-AlN Conductive Composites

| $TiB_2$ | | BN | | AlN | | Electrical resistivity, microhm-cm. | Relative Density, percent $D_T$ |
| --- | --- | --- | --- | --- | --- | --- | --- |
| Wt. percent | Vol. percent | Wt. percent | Vol. percent | Wt. percent | Vol. percent | | |
| 50.0 | 33.5 | 50.0 | 66.5 | | | 585 | 83 |
| 49.6 | 33.5 | 47.0 | 63.3 | 3.4 | 3.16 | 1,255 | 72.3 |
| 48.3 | 33.5 | 40.1 | 55.4 | 11.6 | 11.1 | 821 | 74.4 |
| 45.0 | 33.5 | 22.5 | 33.25 | 32.5 | 33.25 | 558 | 75.5 |

The relative density is expressed as a percentage of the theoretical density as calculated from the densities of the raw materials and is an indication of the porosity and physical strength of the composites. Although, generally, electrical resistivity decreases with increasing density, it can be seen from Table II that the ratio of AlN to BN is more significant than the density in affecting the electrical resistivity. For example, the highest resistivity of 1255 microhm-cm. occurs at the lowest density, 72.3% of theoretical.

In Table III, following, are shown electrical resistivities of various composites in which the amount of titanium boride is varied between 33.5 and 38 volume percent.

TABLE III
Electrical Resistivity of AlN-BN-$TiB^2$ Ternary Composites

| Volume percent | | | Electrical resistivity, microhm-cm. |
| --- | --- | --- | --- |
| $TiB^2$ | BN | AlN | |
| 38.0 | 40.3 | 21.7 | 475 |
| 36.5 | 41.3 | 22.2 | 560 |
| 35.0 | 42.25 | 22.75 | 738 |
| 33.5 | 43.2 | 23.2 | 906 |

It can be seen that maximum resistivity occurs at 33.5 volume percent of titanium boride. Although a preferred range of resistivity for evaporating boats is between about 100 and 1500 microhm-cm. for the vacuum deposition of aluminum, ranges between about 50 to 4800 can be satisfactory for other applications. It is estimated that the corresponding range for the quantity of $TiB_2$ is about 20 to 50 volume percent. Although evaluation of the complete ternary system has not been made, it is expected that a range of about 1 to 65 volume percent of the AlN and 1 to 65 volume percent of the BN will produce useful electrically conductive refractory composites.

In Table IV, following, are shown properties and test results of composites prepared from a constant composition, but vacuum hot pressed at different conditions. The evaporation tests were made on boats dry machined from the pressed bodies. Aluminum was evaporated from the boats at the rate of 1 to 3 grams per minute until a total of 150 grams were evaporated. The boats were then examined to determine the extent of corrosion.

TABLE IV
Evaporation Test Results For The Composition 33.5% $TiB_2$-33.25% BN-33.25% AlN (in volume percent)

| Pressing conditions | | | Density, percent | Elect. resist., microhm-cm. | | Evaporation test corrosion |
| --- | --- | --- | --- | --- | --- | --- |
| Pressure, K p.s.i. | Temp., °C. | Time, hrs. | | As pressed | Machined | |
| 5.0 | 1,900 | 2 | 80.5 | 865 | 1,090 | Some. |
| 1.0 | 2,000 | 4 | 81.5 | 1,880 | 2,820 | Do. |
| 5.0 | 2,000 | 2 | 84 | 725 | 843 | Slight. |
| 5.0 | 2,000 | 6 | 91 | 720 | 935 | Do. |

It can be seen that the pressing conditions greatly affect the ability of the boat to satisfactorily withstand the strains and corrosion of the evaporation process, and that the quality of the boat is improved with longer pressing cycles. The difference in electrical resistivity between the "as pressed" bodies and "machined" bodies is attributed to variations in the surface of the "as pressed" bodies. It is felt the measurements on the "machined" bodies are more definitive.

Table V, following, shows similar test results on composites of varying composition but all vacuum hot pressed at 1800° C. for 2 hours at 5000 p.s.i. The amount of aluminum evaporated from boats machined therefrom is also shown.

TABLE V.—EVAPORATION TEST RESULTS

| TiB₂ Wt. | Vol. | BN Wt. | Vol. | AlN Wt. | Vol. | Density, percent $D_T$ | Microhm-cm. electrical resistivity As pressed | Machined | Grams Al evaporated | Evaporation test corrosion |
|---|---|---|---|---|---|---|---|---|---|---|
| 50.0 | 33.5 | 50.0 | 66.5 | | | 83 | 585 | 1,200 | 150 | Much. |
| 49.6 | 33.5 | 47.0 | 63.3 | 3.4 | 3.16 | 72 | 1,255 | 1,200 | 50 | None. |
| 48.3 | 33.5 | 40.1 | 55.4 | 11.6 | 11.6 | 72–74 | 820 | 1,000 | 150 | Do. |
| 45.0 | 33.5 | 22.7 | 33.25 | 32.8 | 33.25 | 75 | 560 | 620 | 150 | Do. |

The results show that the addition of AlN to the binary composite, TiB₂-BN, has improved the corrosion resistance of evaporating boats. The optimum composition for any particular application, therefore, will depend on the temperature of operation, the metal being vacuum deposited, the evaporation rate required and the mechanical and electrical support for the evaporating boat.

DESCRIPTION OF THE PREFERRED EMBODIMENT

As one example of the present invention, the preparation of a 33.5% TiB₂–63.3% BN–3.16% AlN (volume percent) composite is here described. A sample consisting of 37.85 grams of 10-micron particle size TiB₂ powder, 35.9 grams of 10–15 micron particle size BN and 2.59 grams of −200 mesh AlN was prepared by weighing the above constituents and then mixing them together for 10 minutes in a mixer mill. The sample, weighing a total of 76.34 grams, was then placed in a graphite die having a one-inch diameter cavity, together with corresponding graphite punches. The punch-die-sample assembly was contained in a suitable chamber, which was then evacuated to a pressure of less than $1 \times 10^{-3}$ torr, heated by means of a graphite resistance element to a temperature of 1800° C., and vacuum hot pressed under a compressive stress of 5000 p.s.i. for 2 hours, and a maximum chamber pressure of $2 \times 10^{-3}$ torr. After slow cooling and subsequent removal from the die, the cleaned sample was found to weight 72.3 grams, representing a loss of about 4 grams. The sample was 2.61 inch long by 0.995 inch diameter and had a density of 2.18 g./cc. The last value corresponds to 72.3% of the ideal maximum density of 3.045 g./cc., which was calculated from the X-ray determined densities of the individual constituents. The electrical resistivity was measured and found to be 1255 microhm-cm.

The evaporating boat was then machined from the body. The boat was 2⅛ inches by ¾ inch wide by ⅜ inch thick. The cavity was machined on the upper surface of the boat. The cavity dimensions were 1¼ inches long by ⅝ inch by ⅛ inch deep and it was substantially centrally located on the boat surface.

The boat was then tested in a cylindrically shaped vacuum metallizing chamber having inside dimensions of 30 inches high by 17 inches diameter. The ends of the boat were then clamped by means of a pair of water-cooled copper contacts mounted within the chamber and electrically connected to metal lead-out terminals. A window was provided in the side wall of the chamber in order that the temperature of the boat could be determined optically during operation. A vacuum pump of suitable capacity was connected to the chamber and an alternating current power source was connected through suitable switches, meters and a control to the outer terminals. A feed mechanism and a roll of 0.060 inch diameter 99% plus purity aluminum wire were also installed within the chamber with suitable outside controls for regulating the rate of wire feed to the boat cavity.

After the internal pressure within the chamber had been reduced to $1 \times 10^{-5}$ torr an electrical potential was applied to the lead-out terminals. After the boat had attained a temperature of about 1800° C., the wire feed mechanism was started and the rate of feed adjusted to introduce aluminum to the cavity at a rate of 3 grams per minute. The potential was adjusted to evaporate the aluminum at the same rate and das determined to be 5.1 volts. At these conditions, the current was 500 amperes and the boat temperature was 1630° C. After 150 grams of aluminum, the test was discontinued and the boat was examined. The results of this test and others are reported above in the summary.

I claim:

1. An electrically conductive refractory body consisting essentially of an admixture of aluminum nitride, boron nitride and titanium boride.

2. The body of claim 1 consisting essentially of from 1 to 65 volume percent of aluminum nitride, 1 to 65 volume percent of boron nitride and 20 to 50 volume percent of titanium boride.

3. An evaporating boat for the vacuum deposition of metals consisting essentially of an admixture of aluminum nitride, boron nitride and titanium boride.

4. The boat of claim 3 consisting essentially of about 1 to 65 volume percent of aluminum nitride, 1 to 65 volume percent of boron nitride and 20 to 50 volume percent of titanium boride.

5. The boat of claim 4 wherein said boat has an elongated shape and has two ends suitable for clamping in electrical supply supports.

6. The boat of claim 5 wherein said boat has a cavity disposed therein suitable for containing the metal to be vacuum deposited.

7. In a method for vacuum depositing aluminum from an evaporating boat, the improvement which comprises passing electric current through a heatable evaporating boat composed essentially of an admixture of aluminum nitride, boron nitride and titanium boride.

8. The method of claim 7 wherein said boat is machined from a hot pressed body consisting essentially of about 1 to 65 volume percent of aluminum nitride, 1 to 65 volume percent of boron nitride and 20 to 50 volume percent of titanium boride.

9. The method of claim 8 wherein said boat is vacuum hot press molded from a composition essentially of 1 to 65 volume percent of aluminum nitride, 1 to 65 volume percent of boron nitride and 20 to 50 volume percent of titanium boride, said boat having an elongated shape and a cavity disposed thereon.

References Cited

UNITED STATES PATENTS

| 2,839,413 | 6/1958 | Taylor | 106—55 |
| 3,003,885 | 10/1961 | Mandorf, Jr. | 106—39 |
| 3,181,968 | 5/1965 | Mandorf, Jr. | 252—520 |
| 3,236,663 | 2/1966 | Grulke et al. | 252—520 |
| 3,251,700 | 5/1966 | Mandorf, Jr. | 252—520 |
| 3,256,103 | 6/1966 | Roche et al. | 252—520 |
| 3,408,312 | 10/1968 | Richards et al. | 106—55 |

DOUGLAS J. DRUMMOND, Primary Examiner

U.S. Cl. X.R.

106—55, 65; 117—107